United States Patent [19]

Ishihara

[11] Patent Number: 4,542,424
[45] Date of Patent: Sep. 17, 1985

[54] TAPE SPEED CONTROL APPARATUS

[75] Inventor: Mitsugu Ishihara, Sagamihara, Japan

[73] Assignee: Sony Corporation, Tokyo, Japan

[21] Appl. No.: 356,742

[22] Filed: Mar. 10, 1982

[30] Foreign Application Priority Data

Mar. 25, 1981 [JP] Japan .................. 56-42285

[51] Int. Cl.$^4$ .................. G11B 15/46; G11B 15/52
[52] U.S. Cl. .................. 360/73; 360/18;
360/29; 369/47
[58] Field of Search .................. 360/73, 70, 71, 74.1,
360/74.2, 74.4, 15, 16, 44, 27–30, 18; 369/46,
47; 358/338, 330, 315, 321

[56] References Cited

U.S. PATENT DOCUMENTS

| | | | |
|---|---|---|---|
| 2,656,419 | 10/1953 | Dingley | 360/70 X |
| 2,797,263 | 6/1957 | Dolby et al. | 360/29 X |
| 3,175,035 | 3/1965 | MacDonald | 360/27 |
| 3,947,880 | 3/1976 | Backers et al. | 360/70 X |
| 4,044,388 | 8/1977 | Metzger | 360/73 |
| 4,212,039 | 7/1980 | Koda | 360/73 |
| 4,315,283 | 2/1982 | Kinjo et al. | 358/342 |
| 4,378,573 | 3/1983 | Ogita | 360/28 |
| 4,414,586 | 11/1983 | Hirota et al. | 360/70 |
| 4,439,849 | 3/1984 | Nabeshima | 369/111 |
| 4,463,392 | 7/1984 | Fisher et al. | 360/29 X |

FOREIGN PATENT DOCUMENTS

| | | | |
|---|---|---|---|
| 55-25885 | 2/1980 | Japan | 360/27 |
| 55-38645 | 3/1980 | Japan | 360/73 |
| 56-61056 | 5/1981 | Japan | 360/73 |
| 56-61058 | 5/1981 | Japan | 360/73 |
| 0767503 | 10/1980 | U.S.S.R. | 360/70 |

OTHER PUBLICATIONS

*Video Tape Recorders*, by Harry Kybett, pp. 97 and 75 (Howard W. Sams & Co. Inc., Indianapolis, Indiana, 1974).

*Primary Examiner*—Raymond F. Cardillo, Jr.
*Assistant Examiner*—Steven R. Garland
*Attorney, Agent, or Firm*—Lewis H. Eslinger; Alvin Sinderbrand

[57] ABSTRACT

Apparatus for controlling the speed of advancement of a magnetic tape in a video tape recordor (VTR) of the type including a rotary magnetic head assembly for recording and reproducing an information signal with respect to a plurality of record tracks extending obliquely on a magnetic tape, comprises a recording section including a control signal generator which generates a control signal, a pilot signal generator which generates a pilot signal having a predetermined frequency, an AM modulator which amplitude modulates the pilot signal by the control signal to produce a superimposed or amplitude-modulated signal which is recorded in a control track on the magnetic tape by a fixed magnetic head; and a reproducing section including the fixed magnetic head for reproducing the superimposed signal recorded in the control track on the magnetic tape, a limiter circuit for detecting the pilot signal from the reproduced superimposed signal, an FM detector for detecting a frequency fluctuated component of the detected pilot signal, an envelope detector for reproducing or detecting the control signal from the reproduced superimposed signal, and a servo circuit for controlling a drive motor for the magnetic tape in response to the detected control signal and the detected frequency fluctuated component of the pilot signal so that wow and flutter in the detected control signal are eliminated or substantially reduced by the detected frequency fluctuated component of the pilot signal, and a constant speed of advancement of the magnetic tape is achieved.

8 Claims, 8 Drawing Figures

FIG. 2A CTL
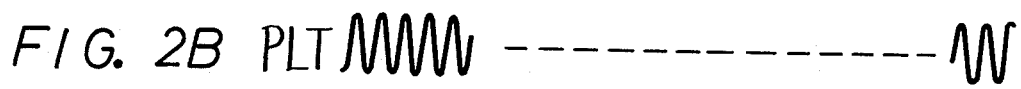
FIG. 2B PLT
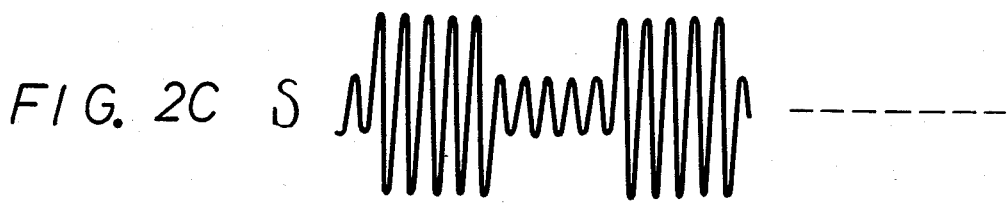
FIG. 2C S
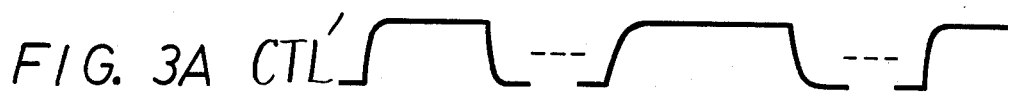
FIG. 3A CTL'
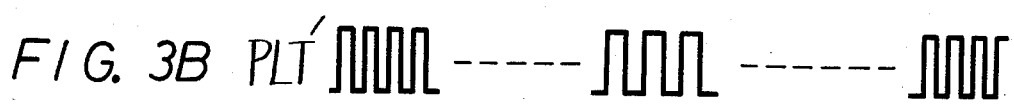
FIG. 3B PLT'
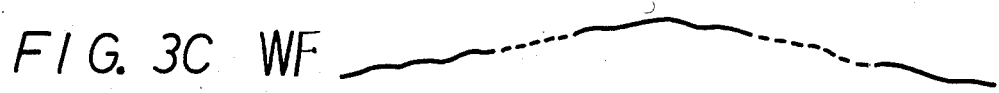
FIG. 3C WF

TAPE SPEED CONTROL APPARATUS

BACKGROUND OF THE INVENTION

This invention relates generally to information signal recording and reproducing apparatus and, more particularly, is directed to apparatus for controlling the speed of advancement of a magnetic tape in an information signal recording and reproducing apparatus.

DESCRIPTION OF THE PRIOR ART

Information signal recording and reproducing apparatus, for example, of the helical scan type video tape recorder (VTR), in which a rotary head assembly records an information signal in a plurality of information signal tracks extending obliquely on a magnetic tape, are well known in the art. In such apparatus, a fixed magnetic head is generally provided for recording a control signal in a control track on the magnetic tape for use during the reproduction operation so as to control the speed of advancement of the magnetic tape and thereby ensure that the information signal is accurately reproduced.

In order to maximize the use of magnetic tape in the recording and reproducing operations, it is desirable to record the information signal on the magnetic tape with a high density. This may be accomplished by decreasing the speed of advancement of the magnetic tape during the recording operation. However, when the speed of advancement of the magnetic tape is decreased, there results a consequent increase in wow and flutter. In such case, the reproduced sound and picture from the VTR may become unstable and thereby result in deterioration in the quality of the reproduced sound and picture.

It has been proposed, in order to overcome such deficiency to also record a pilot signal having a predetermined frequency on the magnetic tape and, upon playback, wow and flutter components of the reproduced signal are detected by a frequency fluctuated component of the pilot signal. This latter frequency fluctuated component is then supplied to a servo circuit which controls the speed of advancement of the magnetic tape to eliminate such wow and flutter. With such proposal, the pilot signal is recorded in a separate track on the magnetic tape. It is to be appreciated, however, that the provision of a separate track which is exclusively used for the pilot signal results in a reduction of tape that can be utilized for recording the information signal, and therefore, is contrary to the aforementioned desire to achieve high density recording.

OBJECTS AND SUMMARY OF THE INVENTION

Accordingly, it is an object of this invention to provide apparatus for controlling the speed of advancement of a magnetic tape that avoids the above-described difficulties encountered with the prior art.

More particularly, it is an object of this invention to provide apparatus for controlling the speed of advancement of a magnetic tape so as to achieve high density recording while eliminating or substantially reducing wow and flutter.

It is another object of this invention to provide apparatus for controlling the speed of advancement of a magnetic tape by means of a pilot signal used for detecting fluctuations in the speed of advancement of the magnetic tape.

In accordance with an aspect of this invention, information signal recording apparatus of the type including first rotary transducer means for recording an information signal in at least one information signal track on a record medium is provided and includes means for generating a control signal; means for generating a pilot signal having a predetermined frequency; means for combining the control signal and the pilot signal to form a superimposed signal; and second transducer means for recording the superimposed signal in a control track on the record medium.

In accordance with another aspect of this invention, in an information signal reproducing apparatus of the type including first rotary transducer means for reproducing an information signal recorded in at least one information signal track on a record medium, apparatus for controlling the speed of advancement of the record medium includes second transducer means for reproducing a superimposed signal recorded in a control track on the record medium, said superimposed signal being comprised of a control signal and a pilot signal having a predetermined frequency; first detecting means for detecting a frequency fluctuated component of the pilot signal from the reproduced superimposed signal; second detecting means for detecting said control signal from said reproduced superimposed signal; and drive means for controlling the speed of advancement of the record medium in response to the detected frequency fluctuated component of the pilot signal and the detected control signal.

In accordance with still another aspect of this invention, in an information signal recording and reproducing apparatus of the type including rotary transducer means for recording and reproducing an information signal with respect to at least one information signal track on a record medium, apparatus for controlling the speed of advancement of the record medium includes a recording section including means for generating a control signal, means for generating a pilot signal having a predetermined frequency, means for combining the control signal and the pilot signal to form a superimposed signal, and transducer means for recording the superimposed signal in a control track on the record medium; and a reproducing section including transducer means for reproducing the superimposed signal recorded in the control track on the record medium, detecting means for detecting a frequency fluctuated component of the pilot signal from the reproduced superimposed signal, and drive means for controlling the speed of advancement of the record medium in response to the detected frequency fluctuated component of the pilot signal and the control signal of the reproduced superimposed signal.

The above, and other, objects, features and advantages of the present invention will become readily apparent from the following detailed description of the illustrative embodiment of the invention which is to be read in connection with the accompanying drawings.

BRIEF DESCRIPTION OF THE DRAWINGS

FIGS. 2A-2C are waveform diagrams used for explaining the operation of the recording section of FIG. 1A; and FIGS. 3A-3C are waveform diagrams used for explaining the operation of the reproducing section of FIG. 1B.

DETAILED DESCRIPTION OF THE PREFERRED EMBODIMENT

Figure 1A:
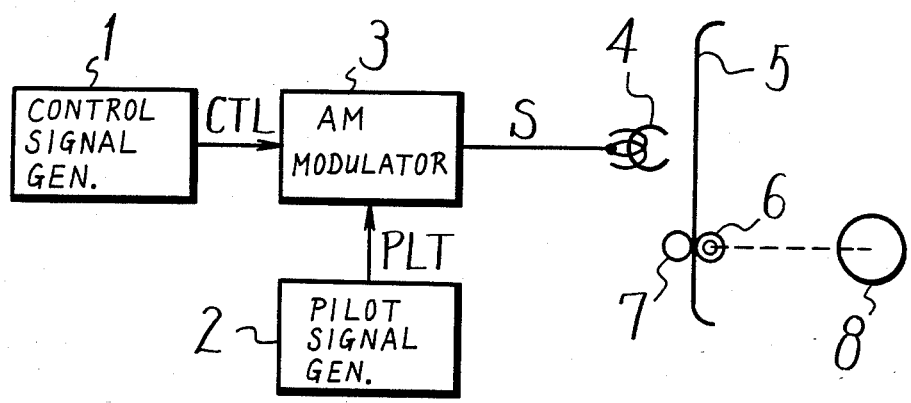
FIG. 1A is a schematic, block diagram of a recording section of a tape speed control apparatus according to one embodiment of this invention.

Referring to the drawings in detail, and initially to FIG. 1A thereof, a recording section of a tape speed control apparatus according to one embodiment of this invention includes a control signal generator 1 for producing a control signal CTL (FIG. 2A), which is conventionally used in prior art apparatus for controlling the speed of advancement of a magnetic tape during playback. A pilot signal generator 2 is also provided and produces a pilot signal PLT (FIG. 2B) which, along with control signal CTL, is supplied to an AM modulator 3 which amplitude modulates the pilot signal PLT by the control signal CTL to produce a superimposed or amplitude modulated signal S, as shown in FIG. 2C. In such case, the frequency of the pilot signal PLT is generally more than twice the frequency of the control signal CTL. The amplitude modulated signal S is then recorded, generally with a low density, in a control track on a magnetic tape 5 by a fixed recording and reproducing magnetic head 4 while magnetic tape 5 is advanced at a predetermined speed by a capstan 6 and pinch roller 7 assembly. It is to be appreciated that in prior art VTRs, the control track has only been used for recording the control signal CTL. A capstan drive motor 8 is also provided for driving or rotating capstan 6 so that the tape pinched between capstan 6 and pinch roller 7 is advanced in the longitudinal direction thereof.

Figure 1B:
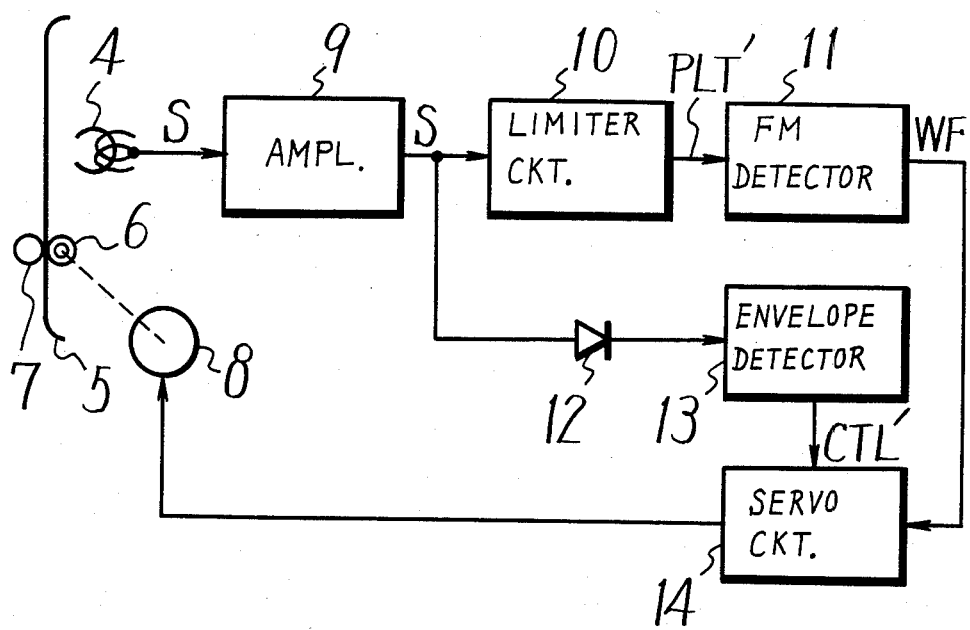
FIG. 1B is a schematic, block diagram of a reproducing section of a tape speed control apparatus according to one embodiment of this invention.

During reproduction, and referring now to FIG. 1B, the amplitude modulated signal S is reproduced by fixed magnetic head 4 and is supplied through a reproducing amplifier 9 to a limiter circuit 10 which extracts a reproduced pilot signal PLT' therefrom, as shown in FIG. 3B. At this time, if no wow and flutter exist in the reproduced pilot signal PLT', the frequency of the reproduced pilot signal PLT' is the same as the frequency of the recorded pilot signal PLT. On the other hand, if wow and flutter exist in the reproduced pilot signal PLT' the latter signal contains frequency fluctuated components. Accordingly, the reproduced pilot signal PLT' is supplied to an FM detector 11 which detects such frequency fluctuated components and produces a signal WF in response thereto, as shown in FIG. 3C, with signal WF corresponding to the amount of wow and flutter in the reproduced pilot signal PLT'. Signal WF is then supplied to a servo circuit 14.

The amplitude modulated signal S from reproducing amplifier 9 is further supplied through a diode 12 to an envelope detector 13 which detects a control signal CTL' in the amplitude modulated signal S and supplies such reproduced or detected control signal CTL' to servo circuit 14. Servo circuit 14, in turn, supplies a servo signal to drive motor 8 to control the speed of advancement of magnetic tape 5. In particular, servo circuit 4 corrects wow and flutter in the reproduced control signal CTL' by means of signal WF, and thereby controls the speed of advancement of magnetic tape 5 in response to the reproduced control signal CTL' and reproduced pilot signal PLT'. For example, the frequency fluctuated component of the pilot signal PLT' can be voltage-converted and supplied to drive motor 8 as part of a servo voltage to correct such wow and flutter. In this manner, since wow and flutter in the reproduced control signal CTL' are eliminated or substantially reduced, the desired tape speed is always obtained. It is to be appreciated that the reduction or correctiion of wow and flutter can be more finely corrected by increasing the frequency of the generated pilot signal PLT from pilot signal generator 2.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In an information signal reproducing apparatus including first rotary transducer means for reproducing an information signal recorded in at least one information signal track on a record medium, apparatus for controlling the speed of advancement of said record medium comprising:
   second transducer means for reproducing a superimposed signal recorded in a control track on said record medium, said superimposed signal being comprised of a control signal and a pilot signal having a predetermined frequency amplitude modulated by said control signal;
   first detecting means for detecting a frequency fluctuated component of said pilot signal from said reproduced superimposed signal;
   second detecting means for detecting said control signal from said reproduced superimposed signal; and
   drive means for controlling the speed of advancement of said record medium in response to said detected frequency fluctuated component of said pilot signal and said detected control signal.

2. Apparatus according to claim 1; in which said first detecting means includes limiter means for reproducing said pilot signal from said reproduced superimposed signal and FM detector means for detecting said frequency fluctuated component of said reproduced pilot signal.

3. Apparatus according to claim 1, in which said second detecting means includes envelope detector means for detecting said control signal from said reproduced superimposed signal.

4. Apparatus according to claim 1; in which said drive means includes capstan means for advancing said record medium, drive motor means for driving said capstan means, and servo means for supplying a servo signal to said drive motor means in response to said detected frequency fluctuated component of said pilot signal and said detected control signal to cause the drive motor means to control the speed of advancement of said record medium.

5. In an information signal recording and reproducing apparatus including rotary transducer means for recording and reproducing an information signal with respect to at least one information signal track on a record medium, apparatus for controlling the speed of advancement of said record medium comprising:
   a recording section including:
      means for generating a control signal;

means for generating a pilot signal having a predetermined frequency;

means for combining said control signal and said pilot signal by amplitude modulating one of said signals with the other said signal to form a superimposed signal; and transducer means for recording said superimposed signal in a control track on said record medium; and a reproducing section including:

transducer means for reproducing said superimposed signal recorded in said control track on said record medium;

detecting means for detecting a frequency fluctuated component of said pilot signal from said reproduced superimposed signal; and drive means for controlling the speed of advancement of said record medium in response to said detected frequency fluctuated component of said pilot signal and said control signal of said reproduced superimposed signal.

6. Apparatus according to claim 5; in which said means for combining includes amplitude modulation means for amplitude modulating said pilot signal by said control signal.

7. Apparatus according to claim 6; in which said detecting means includes limiter means for detecting said pilot signal from said reproduced superimposed signal and FM detector means for detecting said frequency fluctuated component of said pilot signal from said reproduced superimposed signal; and said apparatus further includes envelope detector means for detecting said control signal from said reproduced superimposed signal.

8. Apparatus according to claim 7; in which said drive means includes capstan means for advancing said record medium, drive motor means for driving said capstan means, and servo means for supplying a servo signal to said drive motor means in response to said detected frequency fluctuated component of said pilot signal and said detected control signal to cause the drive motor means to control the speed of advancement of said record medium.

* * * * *